T. S. BELL.
BOTTLE CAPPING MACHINE.
APPLICATION FILED MAR. 3, 1917.

1,307,843.

Patented June 24, 1919.
10 SHEETS—SHEET 1.

Witnesses.
Porter H. Plautt
M. B. Hebner.

Inventor
Thomas S. Bell
By Edwin L. Samuels
Attorney

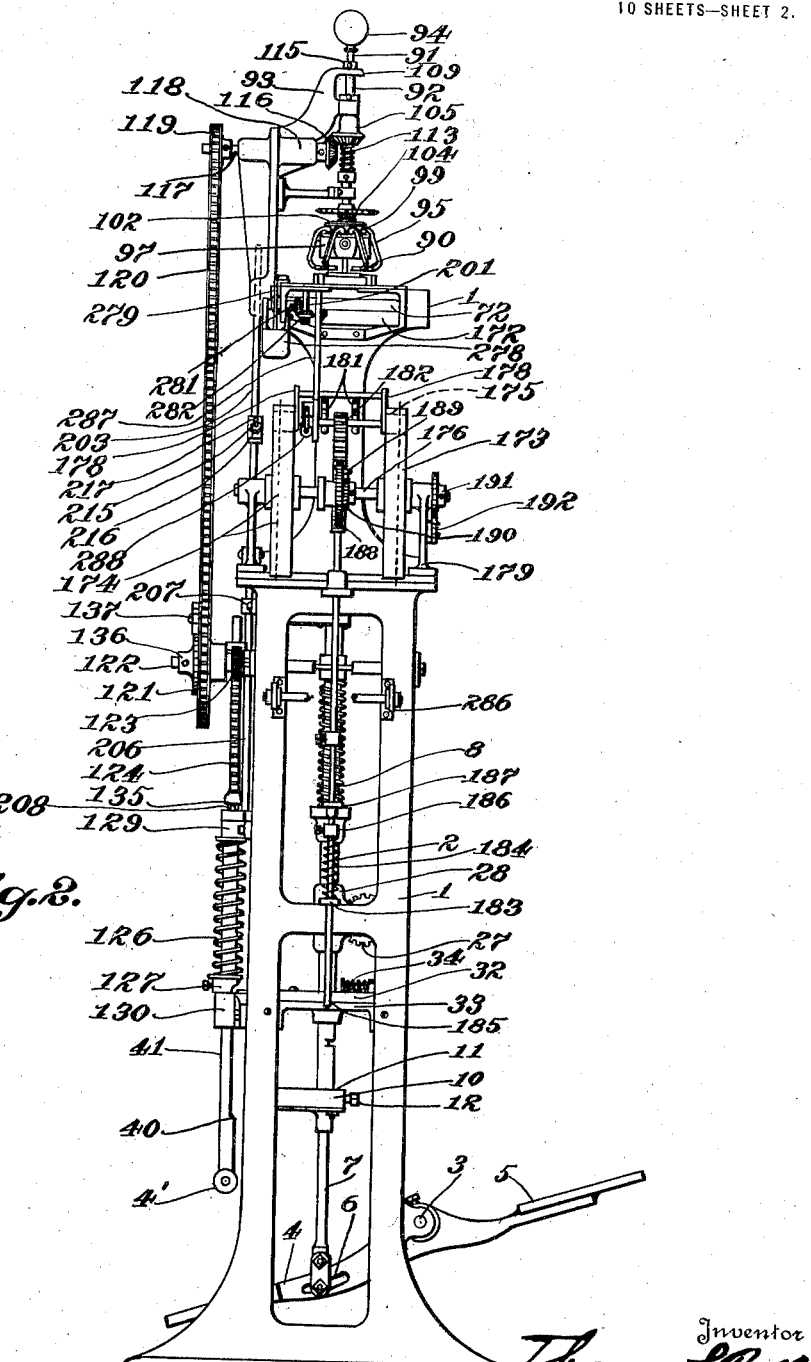

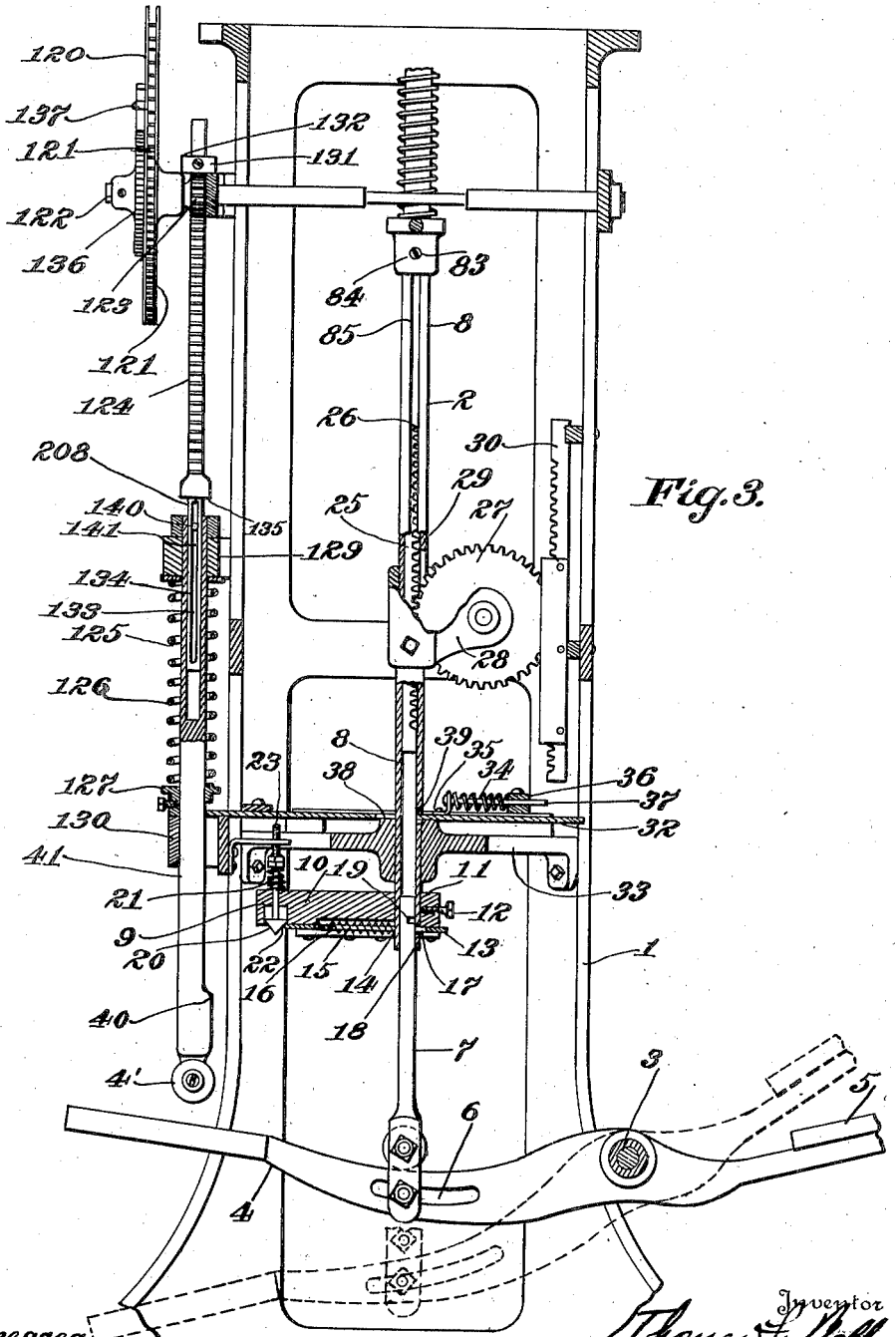

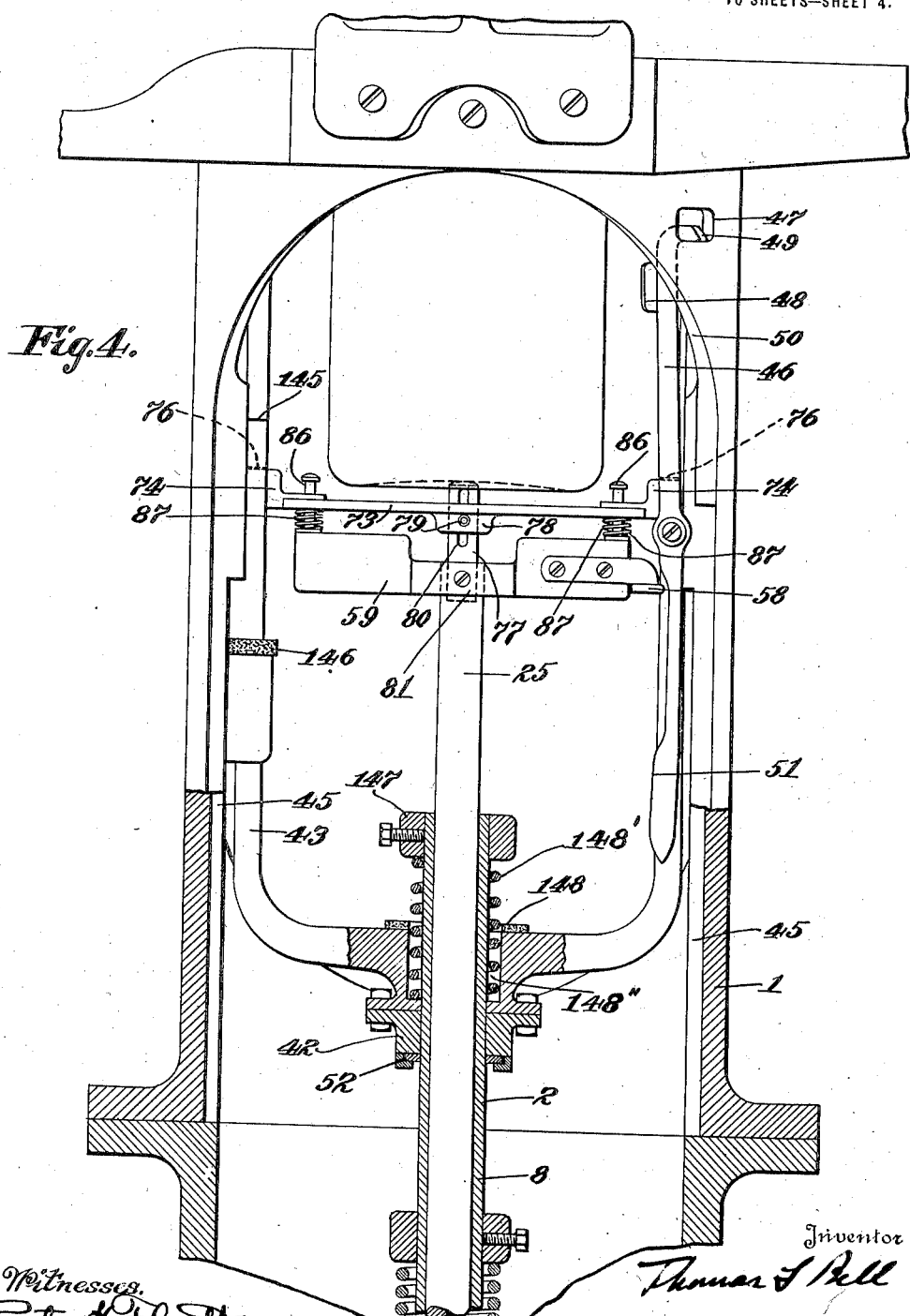

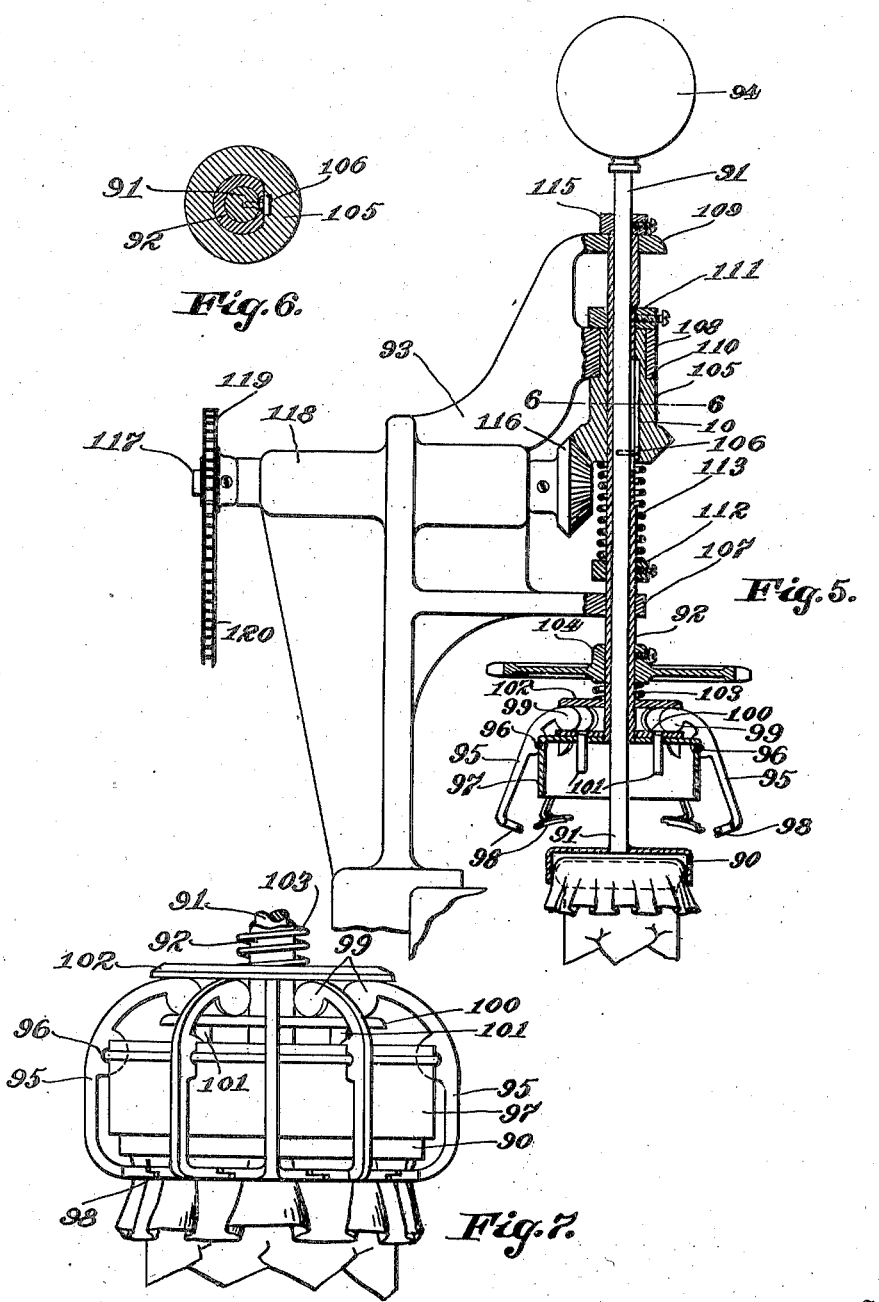

T. S. BELL.
BOTTLE CAPPING MACHINE.
APPLICATION FILED MAR. 3, 1917.

1,307,843.

Patented June 24, 1919.
10 SHEETS—SHEET 6.

T. S. BELL.
BOTTLE CAPPING MACHINE.
APPLICATION FILED MAR. 3, 1917.

1,307,843.

Patented June 24, 1919.
10 SHEETS—SHEET 7.

Witnesses.

Inventor
Thomas S. Bell
By
Attorney

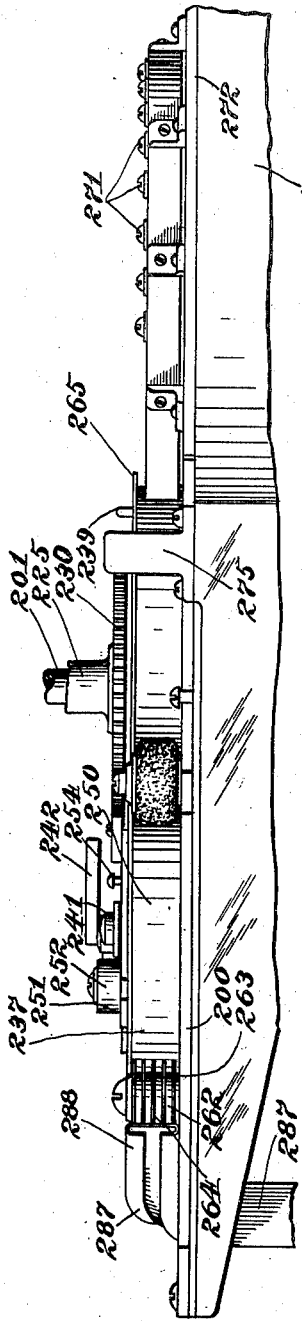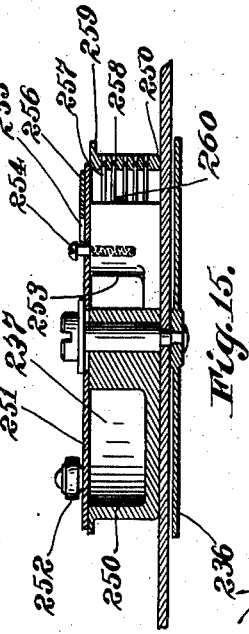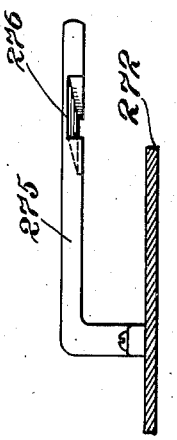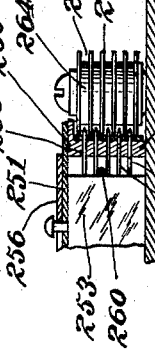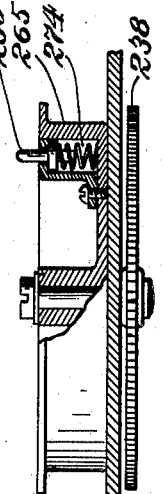

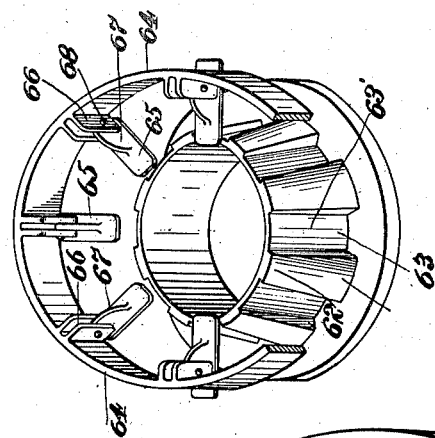
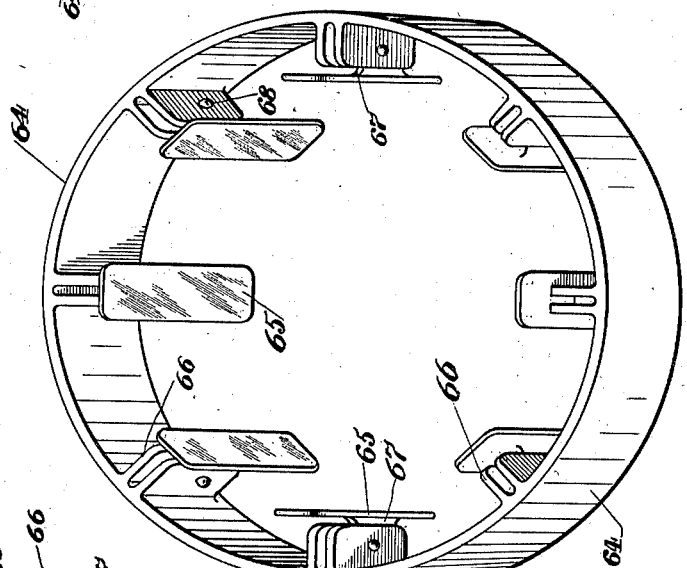
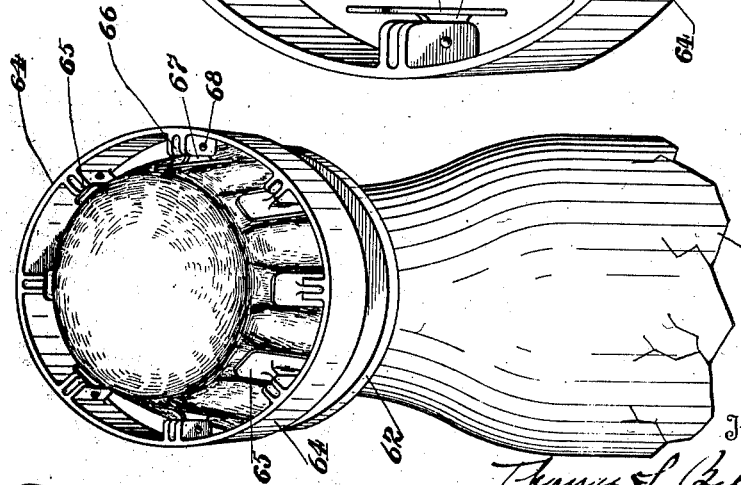

UNITED STATES PATENT OFFICE.

THOMAS S. BELL, OF BALTIMORE, MARYLAND, ASSIGNOR, BY MESNE ASSIGNMENTS, OF ONE-HALF TO JOHN L. WHITEHURST, OF BALTIMORE, MARYLAND.

BOTTLE-CAPPING MACHINE.

1,307,843.     Specification of Letters Patent.     Patented June 24, 1919.

Application filed March 3, 1917. Serial No. 152,188.

*To all whom it may concern:*

Be it known that I, THOMAS S. BELL, a citizen of the United States of America, residing in the city of Baltimore, State of Maryland, have invented certain new and useful Improvements in Bottle-Capping Machines, of which the following is a specification.

In my Patent No. 1,214,746, I have described a paper cap particularly adapted for use on milk bottles and designed to protect the entire external surface of the bottle with which the milk may come in contact in handling, pouring and so forth, as well as to form a tight and impervious closure for the bottle which may be conveniently removed and which, in being removed, is completely destroyed so that the contents of the bottle cannot be tampered with by unauthorized persons, as delivery wagon drivers who in some instances open the bottles under the most unsanitary conditions, take out a portion of the milk and replace it with water obtained from any convenient source along the way. If the cap is removed, it cannot be replaced without making the fact that the bottle has been opened perfectly apparent.

The present invention relates to a machine for and method of applying the cap described in my previous patent. The method consists in a series of steps some of which may be widely varied or entirely eliminated within the scope of my invention, the essential features and the scope of the invention being more fully pointed out in the claims.

In its preferred form, the method of capping bottles in accordance with my invention consists in feeding a web, feeding bottles into alinement with the web, cutting from the web a series of blanks, one corresponding to each bottle, creasing each blank so that its edges may be crimped or plaited to conform to the neck of the bottle, holding the edges in crimped or plaited position in contact with the neck and winding a paste-coated strip of paper around the periphery of the cap or skirt to hold it in close contact with the bottle neck.

Other refinements and details which have little if any bearing on the machine structure or on the capping method, relate to the provision of a web having a strengthened rib which preferably extends longitudinally of the web near its transverse center so that the caps, when applied, contain a strand or fiber or strengthened portion intersecting the cap near its center which serves as a means for severing the cap when it is to be removed. Preferably the blanks are cut with a tab at the end of this strengthened rib and a corresponding notch from which the tab on the next blank is cut. The notch thus formed in the edge of the cap provides an aperture through which the paste on the encircling strip comes in contact with the bottle. The tab, on the other hand, projects from beneath the band opposite the notch, which may be termed the tearing point, the tab being used as a means of engagement for applying tension to the strengthened rib whereby the cap is torn in two along the line of the rib toward the point where the cap is secured to the surface of the bottle by means of the paste entering through the notch.

The organized machine herein illustrated consists of several groups of mechanism combined for the production of a single unitary result. The groups of mechanism referred to consist of means for feeding a paper web, means for cutting the web into blanks, means for creasing the blanks forming plaits or crimps and causing the blank to cover the bottle opening and bringing the periphery of each cap blank down about the bottle neck, means for feeding a band of paper or other material, means for bringing the strip or band into contact with the periphery of the cap, means for rotating each bottle a sufficient number of turns to wind the strip securely about the edge of the cap, whereby the cap is held in fixed position on the bottle, and means for severing the band at intervals. These groups of mechanism may be variously arranged and grouped or separated.

Other advantages of the machine, aside from those discussed, are that it manufactures the cap and applies it to the bottle automatically, eliminating all possibility of contamination during or resulting from the capping process, and the machine is so easy to operate that it may be used with a high degree of efficiency by almost any grade of help.

In the accompanying drawings, I have illustrated so much of a machine embodying the features of my invention, together with the cap which in its finished condition applied to the bottle, is the product of the machine, as is necessary to a complete understanding of my invention.

Fig. 2 is a side elevation taken from the left of the operator;

Fig. 3 is a view taken in a plane parallel to the plane of Fig. 2 showing the lower portion of the machine, certain parts being broken away and sectioned to give added clearness of illustration;

Fig. 4 is a rear elevation showing the die carrier, bottle support, etc., certain portions being broken away and the parts being shown in the relations they occupy when the bottle is in its upper position;

Fig. 5 is an elevation of the top portion of the machine including the bottle gripping and spinning mechanism;

Fig. 6 is a section on the line 6, 6 of Fig. 5;

Fig. 7 is a view of the cap on the bottle neck showing the grippers in operation;

Figure 14:
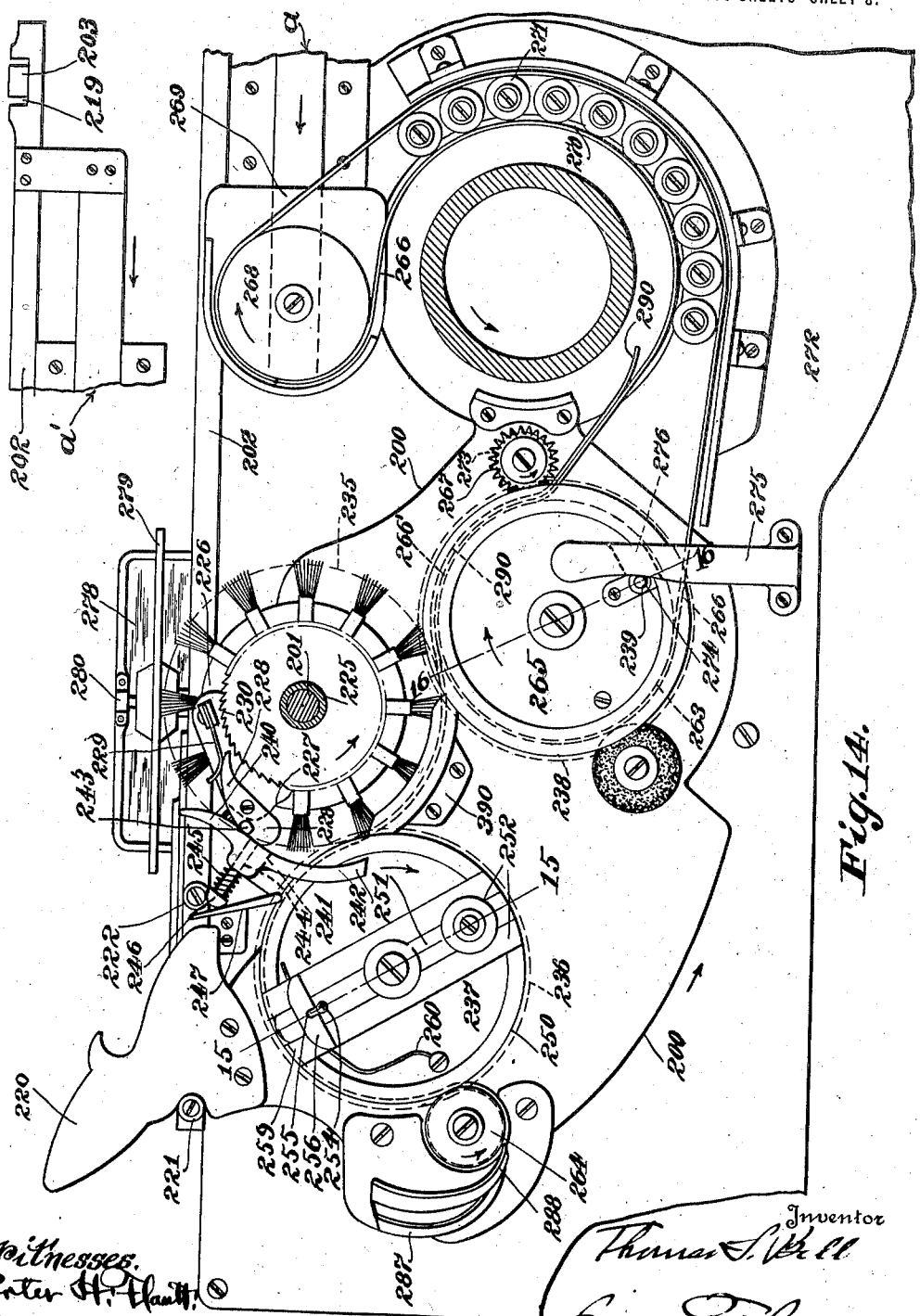

Fig. 14 is a plan of the banding mechanism showing a bottle in section to maintain a sufficient scale for illustration, a portion of the banding mechanism is broken away and shown in fragmentary form in the upper righthand corner of the sheet. This fragment is broken away on the line $a$ of the main figure which corresponds to line $a'$ of the broken-away portion, the parts bearing their true relation when these lines are superimposed;

Fig. 15 is a section on the line 15, 15, Fig. 14, showing the mechanism for weakening the band to determine the point of breaking;

Fig. 16 shows the details of this mechanism;

Fig. 17 is a vertical central section through the band drive wheel taken on the line 16, 16 of Fig. 14;

Fig. 18 is a detail of the duckpin cam or shield arm;

Fig. 19 is an elevation of the banding mechanism;

Fig. 20 shows the crimping ring and fingers;

Fig. 21 shows the crimping ring, etc., in connection with the crimping die; and

Fig. 22 shows the crimping ring, fingers and die operating on a blank in connection with a bottle.

Referring to the drawings by numerals, the machine, as shown, includes an upright frame 1 having a vertical, central shaft 2 mounted to slide in the direction of its length and composed of a plurality of separate members having a relative motion in the direction of their length. Mounted on the frame to swing about a pivot 3 is an actuating lever 4 controlled by means of a pedal 5 which is forward of the pivot 3. Back of the pivot, the actuating lever 4 is slotted at 6 to receive a bolt by which the lever is connected to a thrust rod 7 which forms the lower element of the central shaft 2. This rod enters the lower end of a tube 8 which forms the middle element of the central shaft 2. In the beginning of the operation which will be described in the course of the description of the machine, the rod 7 is locked in position relatively to the tube 8 by means of any suitable latch, as that shown in section at 9 in Fig. 3, which is adapted to be disengaged when in the stroke of the machine as hereinafter described, the central shaft reaches a certain predetermined degree of elevation. The latch 9 consists of a block 10 apertured at 11 to receive the tube 8 and clamped to the tube by means of a screw 12. This block 10 is provided with a sliding bolt 13 which, as shown, is apertured at 14 to encompass the tube and thrust to the left in the view, Fig. 3, by means of a spring 15 which bears against the tube 8 at one end and against a pin or shoulder on the bolt 13 at 16 at the other end, pressing the catch portion 17 of the sliding plate or bar 13 into the registering notches or slots 18 and 19 in the tube 8 and the rod 7 respectively. The release is accomplished by means of a stud 20 mounted in a suitable aperture in the block 10 normally withdrawn by means of a spring 21 and forced downward so that an inclined face 22 engages the end of the plate 13 and thrusts it to the right, releasing the latch when at the predetermined point in the stroke the upper end of the stud 20 strikes a suitable adjustable stop 23 on the frame.

In addition to the tube 8 and the lower thrust rod 7, the shaft 2 includes an element known as the upper sliding rod 25 mounted to slide into the tube above the lower rod 7.

This rod projects above the tube and a portion of it, normally within the tube, is provided with rack teeth 26 engaged by a pinion 27 mounted on a bracket 28 in turn mounted on the tube 8. The pinion 27 projects through a slot 29 in the tube into engagement with the rack teeth 26 and also engages an oppositely disposed stationary rack 30 secured to the frame so that when the tube moves the pinion 27 is rotated by the stationary rack 30 and by engagement with the teeth 26 gives the rod 25 a longitudinal motion relatively to the tube 8 in the same direction as that in which the tube is moving and an increased or multiplied motion relatively to stationary objects, as compared to that of the tube.

When the tube 8 reaches the upper end of its traverse, which is likewise the upper end of the bottle traverse, the latch 9 is released and the tube 8 is locked relatively to the fixed portion of the machine, this being accomplished by means of a latch 32 sliding on a fixed transverse support 33 on the frame and controlled by a spring 34 which bears on a suitable abutment 35 on the sliding latch 32 and against a stationary abutment 36 on the frame, the spring being secured and guided by means of a sliding pin 37. The plate or latch proper 32 is apertured at 38 to receive the tube and the latter is slotted at 39 to admit the edge of the plate, the tube being locked and supported on the frame when the latch engages the notch 39 and released when the latch is withdrawn to the right against the tension of the spring 34 which urges it to the left as seen in Fig. 3. This withdrawal of the latch is accomplished by means of a cam surface 40 carried by the bottle spinning rack 41 which reciprocates vertically at the left in Fig. 3.

Figures 11, 12, 13:
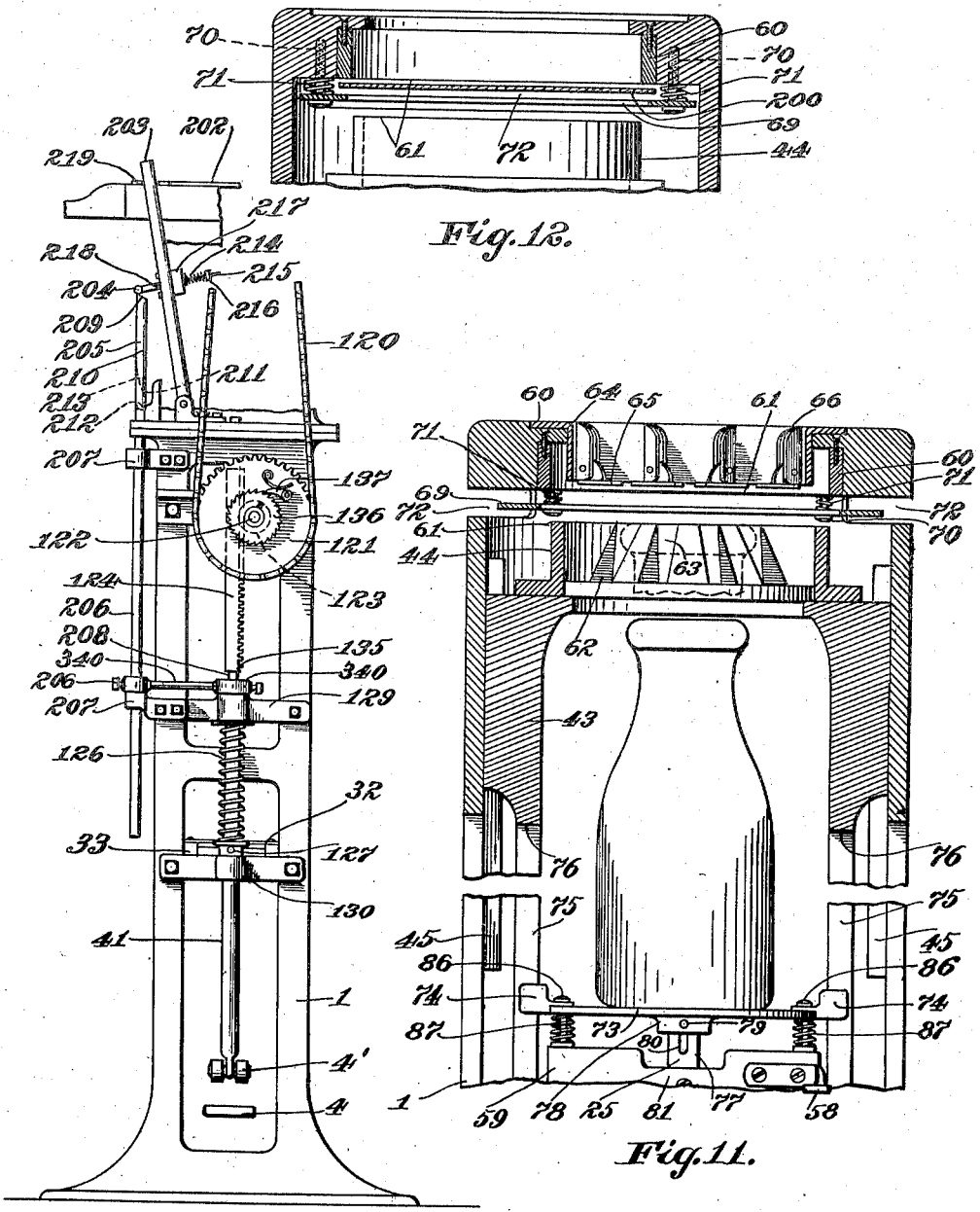
Fig. 11 is a sectional elevation parallel to Fig. 8, showing the internal and external dies and crimping mechanism in operative relation to the bottle.
Fig. 12 is an enlarged central section through the dies.
Fig. 13 is a rear elevation showing the rack, ratchet, gear and chain for spinning the bottle.

Referring now to Figs. 4, 8, 9, 11 and 12, the tube 8, forming an element of the composite shaft 2, carries slidably mounted at its upper end and secured at intervals against sliding by means of a latch 42, a bracket 43, known as the internal die bracket which supports and carries the internal die 44, see particularly Fig. 11. This bracket is mounted to slide in suitable ways 45 in the frame of the machine and is provided with a hook or latch 46, shown as engaging an aperture 47 to support the internal die bracket at the uppermost point in its traverse. The hook 46 is thrust forward by a suitable plate spring 48 causing it to enter the opening 47 when it comes in registration therewith. The hook is released by contact of the cam surface 51 on the tail of the latch lever 46 with the dog 58 on the cross bar 59 which is carried by the rod 25 and therefore has a vertical motion relatively to the carriage 43 as hereinafter described.

Figure 9:
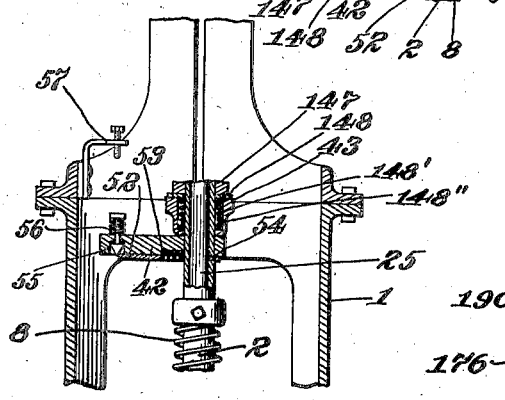
Fig. 9 is a central section through the bottom of the die carrier, the view being taken in a plane at right angles to the plane of Fig. 8.

It has been stated that the internal die carriage is connected to the tube by means of a latch 42. This latch is released at the top of the traverse and the carriage is held in position during a portion of the operation by the hook 46 which serves to suspend it on the frame. The latch 42, as shown in detail in Fig. 9, is similar in construction to the latch 9 shown in Fig. 3. It consists of a sliding plate 52 apertured to pass the tube and normally drawn to the left by means of a spring 53 so that the edge of the plate along the aperture 54 enters the corresponding slot in the tube. The stud 55 having a pointed or cam surface, as shown, engaging the edge of the plate 52, is withdrawn and held in retracted position by means of a spring 56 and when the die carriage reaches the upper end of its traverse, the stud 55 comes in contact with the adjustable stop 57, thrusting the stud downward so that its inclined surface acts on the edge of the plate 52 moving it to the right to clear the notch 54 and release the tube. The relation of the latches 42 and 46 is important as the hook 46 must engage the aperture 47 and support the carriage 43 at the end of its traverse when the latch 42 which connects it to the tube 8 is released.

*Cutting the blank.*—The internal die 44 coöperates with a stationary external die 60 mounted on the frame in proper alinement, the cutting surfaces being designed to produce a blank which is preferably of the kind shown, though it may be of any shape convenient for the formation of a cap of the type illustrated. The cutting edges are indicated by reference character 61 on both the internal and external die. The internal die 44 is in the form of a ring, shown as of L-shaped cross-section with the base of the L turned outward, and mounted within the ring of the external die and in the present instance secured thereto, is a plaiting or crimping die 62 in the form of the frustum of a cone having grooves 63 in the conical surface parallel to the elements of the cone. Coöperating with the crimping die 62 is a crimping ring 64 secured to and mounted within the ring of the external die, carrying crimping fingers 65 pivotally mounted on the internal periphery of the ring, one corresponding to each of the grooves 63, see Fig. 21. In the crimping ring, as illustrated, there are small brackets 66 slotted or arranged in pairs, one pair for each finger and each of the crimping fingers 65 has a fin 67 which enters into a slot and is held by a pivot pin 68. The pivots 68 are near the lower ends of the fingers and these fingers, actuated by gravity, normally swing inward about their pivots so that they hang in a substantially horizontal plane, see Fig. 21, determined by the positions of the contacting surfaces, ready to coöperate with the crimping die or cone and swing upward into position parallel to the bottom surfaces of the grooves as the cone rises, the diameter of the conical crimping die near its lower end, measured from the bottoms of the grooves, being such that in its uppermost position, the fingers bear close to the bottom surfaces 63' of the grooves, i. e., the paper, in the operation to be described, is folded into the grooves but not gripped.

Outside the internal and external dies 44 and 60 is a supporting plate 69 mounted on pins 70 seated in the frame or in the external die. Instead of supporting the plate rigidly, it is found advisable to have it free to give upward on the pins 70 which are out of alinement with the internal die. For this purpose there are springs 71 between the fixed member and the plate so that in case of any difficulty in the operation, it may yield to the action of the internal die. The plate 69 is shaped to support the paper outside the dies and does not extend between them. It prevents the cut paper from following the die on the downward stroke.

As will be hereinafter described, the paper is fed through the slots 72 in the frame; the internal die is raised at suitable intervals into contact with the external die; a blank is cut from the web and the die moves on upward, the blank being carried up by the crimping die 62 which presses it into the crimping ring 64, the fingers 65 entering the grooves 63 pressing the paper into the grooves and forming a crimping cap ready for application to the bottle. This is accomplished by what may be termed the first operation, the tube 8 and the lower thrust rod 7 moving up as a unit.

The bottle to be operated upon when first fed to the machine is placed on a bottle supporting table 73, Fig. 11, which is mounted to slide vertically in the internal die carrier 43. For this purpose, the table 73 has followers 74, see Figs. 4 and 11, to slide in slots 75 in the vertical arms of the carrier 43, the slots 75 terminating abruptly in abutments 76 at their upper ends. The rod 25 carries at its upper end a stud 77 which extends through an aperture in the center of the table 73. Below the table 73 encircling the aperture is a boss 78 and there is a pin 79 in the boss passing through a slot 80 in the stud. In addition to the stud 77, the plate 73 is guided by pins 86 seated in the cross-bar 59 and these pins also serve to position the spiral springs 87 which support the table.

The gearing comprising the rack 26 which is integral with the rod 25, the rotating pinion 27 carried on the bracket 28 secured to the upright tube 8 and meshing with both the moving rack 26 on the rod 25, and the stationary rack 30, has been described. The operation of this gearing is apparent. During the upward traverse of the tube 8, the gear 27 is likewise moved upward. Meshing with the stationary rack 30, it is rotated and at the same time it operates on the rack 26 causing the rod 25 not only to travel with the tube but to move upward relatively to the tube and thus give a multiplied motion to the rod. This multiplied motion is communicated to the cross-bar 59 on the yoke 81 and this, acting through the springs 87 raises the table 73 with the bottle thereon and pushes it upward through the dies engaging the paper cap which at this time is held by the crimping mechanism. The bottle, being centered with the cap by means of the internal conical surface of the crimping die 62, engages it; the cap is seated evenly on the lips of the bottle opening and carried upward by the bottle and drawn out of and released from the crimping mechanism, which, as has already been stated, does not grip the paper tightly. As the upward motion continues, the latch 42 is released, as previously described, and the hook or latch 46 enters and engages the aperture 47 and the internal die carriage 43 stops.

The cross-bar 59 and the rod 25 being carried upward by the action of the rack 26 and the gearing meshing therewith causes the followers 74 to come in contact with the shoulders 76 compressing the springs 87 so that the stud 77 projects from the table and supports the bottle as a central pivot during the spinning of the bottle. At this point the latch 32 engages and supports the tube 8 and the latch 13 releases the lower rod 7.

The next operation is the spinning of the bottle and winding of the band around the skirt of the cap. The spinning mechanism is shown in Figs. 2, 3, 4, 5, 6 and 7.

As the lips at the top of the bottle rise above the opening in the crimping ring, they enter an inverted cup 90 carried at the lower end of a vertical rod 91 which is mounted to slide in a hollow shaft 92 which shaft is mounted to rotate in suitable bearings in a bracket 93 secured to the top of the frame. The rod 91 is suitably weighted as by means of a ball 94 at its upper end, and the cup 90 is so designed as to form a rather close fit over the lips of the bottle covered by the paper cap so as to form the periphery of the cap and turn it downward over the bottle lips. As the bottle moves upward, it lifts the cup 90, the rod 91 and the weight 94 and enters between the grippers 95.

The grippers as shown, consist of a series of levers intermediately pivoted at 96 on a suitable support 97 carried by the shaft 92 at its lower end and shown as constructed in the form of an inverted cup adapted to admit the cup 90. The gripper levers 95 normally hang by gravity in a position slightly inclined outwardly from the vertical and, as shown, are provided at their lower ends with fingers 98 curved each in the form of a circular arc, as hereinafter described. The lower arms of the gripping levers are of sufficient length to put the fingers 98 just below the lip of the bottle so that they engage the upper portion of the skirt or what may be termed the waist-line of the cap, and at their upper ends, they are provided with a ball or other suitable bearing member 99 which is engaged from beneath by a disk 100 which is apertured to take over the hollow shaft 92 which rests on the upper side of the bottom of the inverted cup 97. The disk 100 is provided with downwardly projecting studs 101 which pass through the cup 97 and enter the space inclosed by the cup. The balls or bearing members 99 at the upper ends of the levers 95 are pressed from above by a circular disk 102 also centrally apertured to admit the shaft 92 and pressed downward by a spring 103 which engages the hub of a sprocket 104 secured to the shaft and driving the banding chain as hereinafter described. As the bottle rises it carries the cup 90 and the shaft 91 upward so that the lip and neck of the bottle with the cup 90 enter the cup 97 from beneath. The upper surface of the cup 90 engages the pins 101 lifting the disk 100 whereby the balls 99 on the upper ends of the levers 95 are forced upward against the tension of the spring 103, the grippers are rotated in vertical, radial planes concentric with the shaft 92 and with the bottle, and the grippers swing inward and engage the waist-line of the cap as already described, gripping the bottle within the cup and holding it firmly.

The hollow shaft 92 carries a beveled gear 105 which is keyed to the shaft by spline 106 which prevents rotation of the shaft relatively to the gear but permits the parts to slide one relatively to the other. The bracket 93 has three horizontal arms 107, 108, and 109, the upper and lower of which are apertured to receive the shaft 92 forming a bearing therefor. The middle one has a larger opening and the gear 105 is reduced or shouldered at 110 and the reduced portion enters therein. Above the gear the collar 111 is secured to the shaft. This collar bears on the top surface of the arm 108 and serves to support the hollow shaft in the bracket. Above the arm 107 is a collar 112, also secured to the hollow shaft 92 and between the collar and the lower surface of the beveled gear 105 is a spiral spring 113 which serves to normally draw the shaft 92 down to the position in which it is shown in Fig. 5 so that the shaft may, to accommodate different sized bottles and under other circumstances, be pushed up through the gear compressing the spring 113. The inner rod or shaft 91 is normally supported in the position shown by a collar 115 secured thereto and resting on the top surface of the bracket arm 109.

Meshing with the beveled gear 105 is a second beveled gear 116 mounted on a horizontal shaft 117 having a suitable bearing 118 in the bracket 93 and carrying at its extremity opposite the beveled gear a toothed sprocket 119 rigidly secured to the shaft. A sprocket chain 120 transmits motion from a sprocket 121, loose on the horizontal shaft 122, mounted below in the machine frame, see Fig. 13, to the sprocket 119. This shaft 122 is in turn driven by a pinion 123 secured to the shaft and meshing with the vertically reciprocating rack 124 actuated by a vertically sliding rod 41, the rack having, as shown, a tail or stem 133 which enters a hollow or socket 134 in the upper end of the sliding rod 41, the operative relation of the rack and rod being determined by engagement of a shoulder 135 on the rack with the upper end of the rod. The rod 41 is actuated by a lever 4 which engages its lower end, preferably at intervals, rollers 4' being provided at the lower end of the rod to ease the contact of the parts. In the form of the invention shown, the rod 41 is pressed downward by spiral spring 126 encircling the rod and bearing at its upper end against the frame, particularly in the present instance, the cross-bar 129 thereon and at its lower end against a collar or abutment 127 on the rod which is guided in suitable bearings in the frame, particularly the cross-bar 129 and the cross-bar 130 in the form of the machine shown. The collar 127 also acts as a stop to limit the downward motion of the rod by contact with the cross-bar 130.

The upper end of the rod 41 comes into engagement with the shoulder 135 at the lower end of the rack 124 after the grippers 95 have taken hold of the bottle, the feeding of the end of the band having in the meantime taken place. The rack immediately moves upward rotating the pinion 123 and hence, the shaft 122 which carries adjacent the sprocket 121 a ratchet 136 secured to the shaft, the sprocket 121 being provided with a pawl 137 which engages the ratchet during the upward motion of the rack and escapes from the teeth during the downward motion to be hereinafter described so that the bottle rotates after the end of the rod 41 comes in contact with the shoulder 135 for the remainder of the time that the foot is pressing downward on the pedal 5 and the lever 4 is swinging upward about the pivot 3.

At the end of the upward stroke, the foot having been taken from the pedal 5 and the support having been removed from beneath the bottle, as hereinafter described, the rod 41 drops carrying down with it the rack 124 which is connected to the rod by means of a pin 140 seated in the upper end of the rod and engaging the slot 141 in the tail of the rack so that in case the rack sticks, the rod 41 draws it down. During the falling of the rack 124, it is still in mesh with the pinion 123 but the reverse rotation of the pinion and shaft causes the teeth of the ratchet 136 to escape the pawl 137 so that no motion is communicated to the sprocket 121 and there is no backward rotation of the grippers.

During the rotation of the bottle, the band at the bottom of the skirt of the cap has been applied by a banding mechanism provided for that purpose and to be hereinafter described.

When the lever 4 is at approximately the top of its stroke, the spinning of the bottle having been finished, the cam surface 40 on the sliding thrust rod 41 engages the end of the plate 32 releasing the tube 8 so that it moves downward, being partly supported by the foot lever 4, the upper end of the rod 7 bearing against the lower end of the rod 25. The pressure being now relaxed on the pedal 5, the parts, that is the tubular shaft 8, the rod 25, and the bottle spinning rack and rod, are moved downward easily partly supported by the pedal lever 4, the collar 147 on shaft 8 approaching the pad 148 and compressing the spring 148'. The bottle and the supporting table 73 likewise move downward causing the bottle to pass out of the banding mechanism and descend. The inner die carriage 43 with the die, etc., is however still supported on the hook or latch 46 but the cross-bar or rod 59 carried on the rack as it passes down, brings the abutment 58 into contact with the cam surface 51 and the latch lever 46 releases the latch so that it moves downward until the shoulder 145 engages the supporting surface or stop 146 on the frame. As the acceleration of the carriage might be too slow to get the parts, particularly the plaiting or creasing finger, etc., out of the way of the paper being fed in, it is thought advisable to increase its gravity accelerative motion and for this purpose, a spiral spring 148' has been placed between the collar 147 on the tube or hollow shaft 8 and the carrier, the spring being seated in a socket in the carrier at 148''. The tube 8 moves on downward until the collar 147 on the upper end of the tube engages the stop washer 148 on the die carrier or until, the carrier and the tube being then in their normal relative positions, the latch 42 comes into engagement. As the actuating lever propelled by the weight of the parts resting thereon continues its downward stroke, the latch 13 again becomes engaged with the slot 19 in the bottom push rod 7 and the reciprocating parts have returned to normal position.

Figure 1:
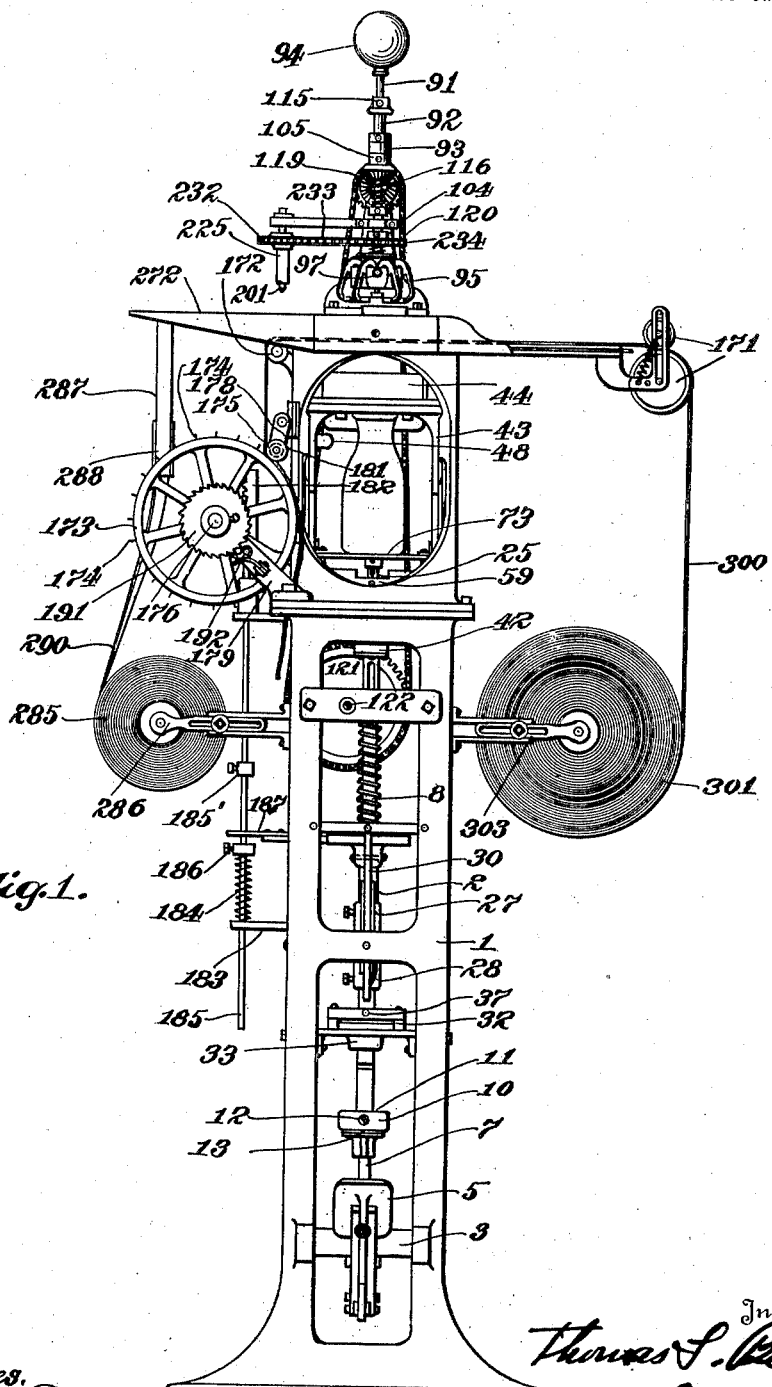
Figure 1 is a front elevation of the machine.
Figure 8:
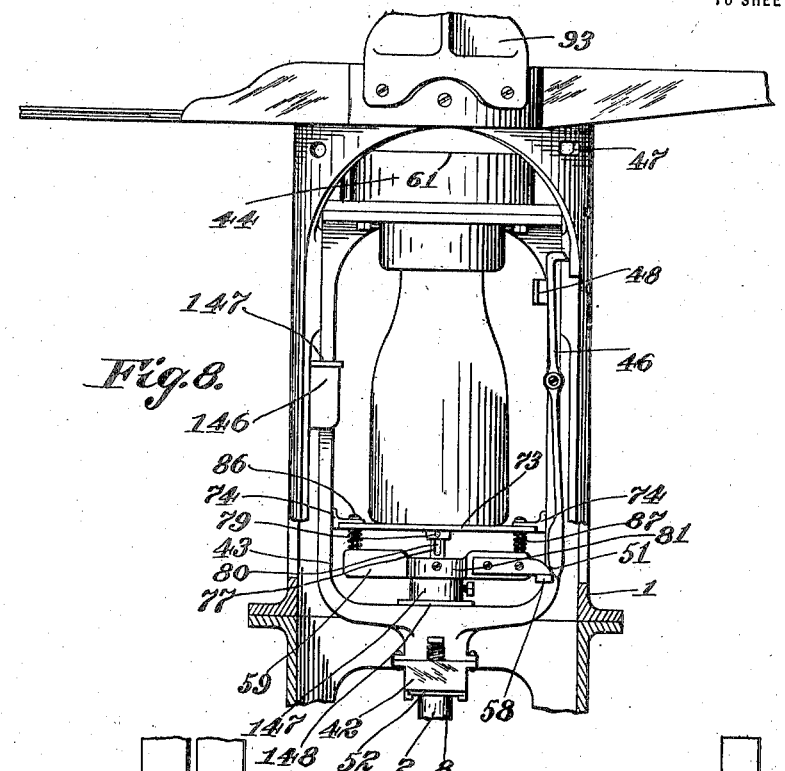
Fig. 8 shows the dies with the die carrier, etc., from the rear at the beginning of the stroke.
Figure 10:
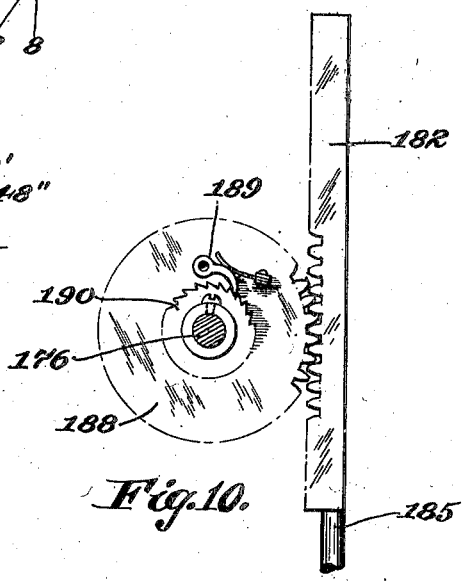
Fig. 10 shows the ratchet and pawl with gear and rack for operating the feed mechanism.

After each capping operation, it is necessary to provide paper for a new blank. This is accomplished in the machine illustrated by means of the feeding mechanism shown in Figs. 1, 2 and 10. The paper is supplied to the machine in the form of a web 300 from a roll 301 on a suitable rack 303. The web is fed through tension rolls 171, see Fig. 1; thence it passes through openings 72 between the dies and over guide roll 172 to the tension wheels 173 having radiating prongs 174 which pierce the web and engage it. The paper is held in contact with the wheel by presser rollers 175 slotted to admit the prongs. These wheels are mounted on shaft 176 and spaced apart so that they underlie the paper adjacent each lateral edge of the web and the prongs or teeth 174 which pierce the paper immediately adjacent the edges and afford the necessary grip to keep it under a suitable degree of tension during the entire operation and draw it forward as described. This operation is facilitated by means of presser rolls 175. These rolls are shown as mounted each on a small lever 178 pivoted on the frame and pressed downward against the feed wheels or rolls by plate springs 181.

To supply the paper to the dies in the proper sequence, it is necessary to feed forward after each capping operation a length of paper equal to the diameter of the blank cut. In other words, the feed wheels 173 must be rotated step by step at proper intervals corresponding to the operations of the machine and turning the circumference of the wheel through an arc equal to the desired length of paper. This is accomplished by means of the reciprocating motion imparted to the tube 8 which carries the arm 187 which is apertured to receive the rod 185 to which a rack 182 is secured. The rod 185 extends downward through an apertured bracket 183 on the machine frame and is encircled by a spiral spring 184 which bears against the top surface of the bracket and against the collar 186 on the rod 185 immediately beneath the arm 187. The rack 182 engages a pinion 188 loosely mounted on the shaft 176 and carrying a pawl 189 which engages a ratchet wheel 190 secured rigidly mounted on the shaft 176; in other words, both the ratchet wheel 190 and the feed wheels 173 are secured to the shaft 176. The tendency to backward rotation of the shaft 176 by which the paper might be loosened or permitted to feed back into the machine is arrested by means of the ratchet 191 secured to the shaft and engaged by the pawl 192 on the bracket 179.

The pinion 188 and the rack 182 with the stroke of the rack provided by contact of arms 187 with dogs 186 and 185' alternately, are so proportioned as to give a feed of the paper equal to the diameter of the dies which has been expressed as the length of the desired blank. This is during the downward traverse of the shaft 8.

The banding mechanism by means of which the bands referred to are wound around the skirt of the bottle cap and fastened, illustrated in plan in Fig. 14 which is broken at a—a' to provide room for a complete showing, in elevation in Fig. 19 and in detail in Figs. 15, 16, 17, 18 and 19, consists of a horizontal plate 200 known as the banding plate, mounted to swing about the shaft 201 and other functioning parts by which the paper band is delivered broken into lengths and wound about the skirt of the bottle cap. The plate 200 is actuated by a sliding bar 202 which is moved back and forth in the direction of its length by suitable means as a swinging lever 203 which carries a follower 204 engaging a cam 205 mounted on a vertically sliding cam rod 206. This rod 206, which is mounted in suitable bearings 207 on the frame, is in turn actuated by the vertically sliding rod 41 which carries an arm 340, the same being secured at one end to the sliding cam rod 206 and at the other end to the vertically reciprocating rod 41 of the bottle spinning gear (Fig. 13). In this connection, it should be noted that there is a considerable amount of play or lost motion at 208, between the rod 41 and the rack 124 or the shoulder 135 thereon so that the bottle spinning mechanism which is operated by the rack 124 does not begin to move until the sliding cam rod 206 actuated by rod 41 has moved up a distance equal to the space 208 between the top end of the rod 41 and the shoulder 135 on the rack 124 which introduces an interval of rest between the time when the cam 205 begins to operate on the roller 204, and hence the initial motion of the banding plate, and the time that the bottle begins to rotate.

In the present form of the machine after the bottle is inserted and just prior to the commencement of the spinning of the bottle, the cam 205 moves up sufficiently to cause the inclined cam surface 209 to act on the follower 204 swinging the lever 203 to the left, Fig. 13 being a back view, and giving the swinging motion of the banding plate. During the bottle spinning operation, the cam 205 moves on upward and the vertical surface 210 of the cam passes the roller which is finally engaged by the point 211 of the cam, being caused to pass the point by the deflector 212 also carried by the vertically sliding rod 206. It is not until the vertically reciprocating members begin to drop that the return stroke of the lever 203, caused by the action of the curved surface 213 of the cam 205 on the roller 204 takes place. This motion is cushioned by the spring 214 on the pin 215 bearing at one end against the nut 216 thereon and at the other end against the lock 217 carried by the lever 203, the pin 215 being shouldered or provided with a suitable stop as a transverse pin 218 to limit the motion of the pin 215 and the roller 204 in response to the tension of the spring. The sliding rod 202 is notched at 219 or otherwise provided with means for engaging the rod 203, see Fig. 13.

Referring now to the banding plate 200 pivoted at 201, this plate, as shown, carries a cam 220 engaged by two followers or rollers 221 and 222 on the sliding rod 202. This cam is for the purpose of regulating the motion transmitted to the plate by the rod 202. This may be accomplished in other obvious ways as may many of the functions of the machine. The cam surfaces to be engaged by these followers are so arranged that at the beginning of the bottle capping operation, i. e., when the rod 206 first moves up prior to the bottle spinning and the sliding rod moves to the left in Fig. 14, the plate 200 swings through a short arc in left-handed, i. e., contra-clockwise rotation about the shaft or center 201, and when the follower 204 passes the point 211 and engages the curved surface 213 on the cam 205, the sliding rod 202 moves to the right in Fig. 14, causing the plate to rotate through a corresponding arc, in clockwise or right-handed rotation.

The shaft 201 carries mounted thereon a freely rotating sleeve 225 and fixed to the shaft a gear 235, brush wheel 226 and an arm 227 carrying a pawl 228 pivoted thereon and a suitable spring 229 for actuating the pawl and tending to keep it in mesh. The rotating sleeve 225 carries a ratchet 230 with teeth turned contra-clockwise to impart clockwise revolution to the shaft 201 when the pawl engages the ratchet. The sleeve 225 also carries a sprocket 232 driven by a chain 233 from a sprocket 234 on the bottle spinning shaft, see Fig. 1. The toothed gear 235 meshes with a gear 236 carrying the perforating mechanism 237 and a gear 238 driving the band pulley 265, carrying a duckpin 239. The banding plate also carries a cam 240 stationary thereon for controlling the pawl 228. This cam terminates at 241 and there is a second cam 242 continuous therewith, see Fig. 14, but having its surface raised above the cam 240 so that the pawl 228 in fact escapes the cam when it passes the end surface or corner 241. The cam 242 actuates the perforating mechanism. The pawl 228 carries a lug 243 coöperating with a stop pin 244 seated in the stationary cam 240 and normally withdrawn by a spring 245. The pin 244 has a rounded head 246 which acts as a follower engaging a cam 247 which is stationary, i. e., rigidly secured to the machine frame.

The perforating mechanism illustrated in sectional elevation in Figs. 15 and 16 and in plan in Fig. 14, numbered 237, consists of a casing 250 mounted to rotate with the gear 236. The casing 250 carries a transverse sliding plate 251 which, as shown, extends across the top of the casing and is mounted in suitable ways 252 thereon, see Fig. 14. This sliding plate 251 is provided with a cam follower 252 and at the opposite end a perforator block 253 is secured to the plate 251. This block is guided by a pin or screw 254 which slides into a slot 255 in a guide plate 256. The block 253 carries a number of radially projecting prongs 257 which slide through suitable apertures 258 in the circumferential wheel 259 of the casing 250. The prongs 257 are normally withdrawn by means of a spring 260, see Fig. 14, but in operation are pressed forward by the action of the cam 242 engaging the follower 252 as the perforator rotates, sliding the plate 251, as seen in Fig. 15, to the right moving the block 253 in a similar direction and thrusting the prongs or perforator pins 257 outward through the apertures 258 in the circumferential casing 250 of the perforator. At the same time the rotation of the casing brings the perforator pins into registration with the slots 262 between the disks 263 of the perforator roller 264, see Figs. 16 and 14, the band being at the time fed between the roller 264 and the perforator 237, or more properly, the perforator casing 250 so that the pins or prongs 257 are thrust through the paper giving a transverse line of perforations.

The main function of the gear 238 is to drive the band pulley 265 which in turn drives the belt or band 266. This pulley is mounted on and moves with the banding plate. The belt 266 passes around this pulley, the arc of contact with the pulley being preferably increased by the toothed guide pulley 267 also mounted on the banding plate and driven by a gear 273 on the same shaft and meshing with gear 238. The belt 266 also passes over an idler 268 mounted on a block 269 secured to and moving with the sliding rod 202 and between the pulleys 265 and 268, a double intermediate portion of the belt 266 at 270 is guided by rollers 271 on the table 272 and arranged on a circular arc concentric with the axis of the bottle. The best material so far as has been ascertained for use in the belt 266 is flexible steel. When mounted as described, the inner side of the loop takes the arcuate form shown bearing against the rollers 271. In addition to acting as a driving pulley for the belt 266, the pulley 265 carries a spring-pressed pin 239 referred to herein as a duckpin. This pin is seated in a socket 274 in the pulley 265 parallel to the axis thereof and is yieldingly mounted so that it normally protrudes from the socket but can be easily pushed back so that it disappears in the socket in the pulley. Coöperating with the duckpin 239 is the duckpin arm 275, see Fig. 18, shown as L-shaped, secured at one end to the table 272 extending vertically upward from the table and then horizontally over the table in the path of the pin in its normal position. The function of the duckpin arm 275 is to engage the pin upon its vertical surface when the banding plate is swinging in left-handed phase, or contra-clockwise, arresting or partially arresting the motion of the parts with the result hereinafter described and to permit the pasage of the duckpin when the pulley 265 is rotated in right-handed phase, or clockwise. To provide for this action, the duckpin arm 275 has a path which may be termed a cam path 276, presenting an inclined surface to the pin so disposed that during the right-handed revolution of the pulley, or when the banding plate is revolving in right-handed or clockwise direction, the pin enters the path in the duckpin arm freely, being depressed further and further as it is carried along until it reaches the edge of the arm at the left in Fig. 14 and is released. In released position, the pin projects upward into the path of the arm 275 or rather the arm projects into its path and arrests the rotative motion of the pulley 265 whenever it moves or tends to move contra-clockwise about the center 201 as hereinafter described.

The pot 278 at the side of the table opposite the brushes 226 contains paste or other suitable adhesive which is raised and delivered to the brushes by a rotating disk 279 on a shaft 280 carrying a beveled gear 281 which meshes with a beveled gear 282 on the end of the shaft 281, see Fig. 2. It will be obvious that the disk 279 rotates whenever the bottle spinning mechanism is in operation supplying paste to the brushes whenever it is needed. In the mechanism described, the band is fed to the banding plate from a roll 285, see Fig. 1, mounted on a suitable bracket 286 on the machine frame, the band being turned and led upward through a flat tube 287 which may be provided with rollers 288 mounted in a suitable slot in the tube and bearing on the band. The tube 287 leads to the top of the banding plate, see Fig. 19, where it is bent and turned to one side terminating in a tangent to the perforating roller 264 at 288, see Figs. 14 and 19.

In the operation of the banding mechanism, the band is led from the roll 285 upward through the tube 287 where it passes around the perforating roller 264 between the perforating roller and the casing or roller 250. The perforator roller 264 rotates contra-clockwise and the casing or pulley 250 clockwise, as indicated by the arrows, carrying the paper around the latter roll whence it passes a stationary guide 390 in contact with the brushes 226 receiving a suitable coating of paste or other adhesive. The duckpin pulley 265 rotates clockwise as indicated by the arrow and serves to drive the belt 266. The band is led from the brushes in contact with the belt along an arc 266' of the pulley 265 by which it is carried forward into contact with the toothed roller 267 and hence into the loop 270.

The mechanism will be considered under the supposition that the banding of a bottle has been completed and the parts returned to normal position, that is, the pedal is up and a bottle has just been placed in the machine.

The sequence of operations of the machine as shown is as follows, though it may be varied within the scope of the invention. When the pedal 5 is first engaged, causing the lever 4 to swing upward, raising the rod 7, the rod 7, being at this time locked to the tube 8 by the latch 9, causes the latter to move upward imparting a multiplied motion by means of the gear 27 and the rack 30 to the rod 25 having rack teeth 26 which mesh with the gear 27. The multiplied motion referred to makes it possible to move the bottle the necessary distance to accomplish the capping operation with a comparatively short stroke of the pedal and other parts. When the tube 8 reaches the upper end of its traverse, the internal die carriage 43 being locked by the latch 46, see Fig. 4, and the other parts being in the relation shown in Fig. 3, the dies having been operated cutting the blank and plaiting it, and the bottle thrust upward through the dies, removing the plaited blank from the plaiting mechanism and carrying it upward on the bottle into the banding mechanism, the tube 8 is released from the rod 7 by the latch 9 and locked to the frame by the latch 32 and the spinning and banding mechanism operates, the banding mechanism taking the lead because of the clearance at 208 which permits the cam surface to move the banding plate by means of the sliding bar 202 rotating the banding plate slightly in anti-clockwise direction, feeding the band into operative relation with the bottle and belt and tightening the belt before spinning takes place, the spinning mechanism being operated by the upward motion of the rack 124, see Fig. 3.

Referring to Fig. 3 which shows the parts in the position occupied by them after the cutting and plaiting operations when the bottle has reached the top of its traverse and just before the operation of the spinning and banding mechanism, the pedal being shown in its normal or initial position in Fig. 2 and in dotted lines in Fig. 3, the clearance in the initial position of the pedal between the lower end of the rod 41 which actuates the bottle spinning rack 124 and the banding plate cam 205 will be noted, showing that the spinning and banding operations do not take place until the latter end of the working stroke.

As the cam 205 moves upward being actuated as already described by the pedal lever at the latter end of its stroke, the inclined surface 209 engages the roller 204 moving it to the right, as seen in Fig. 13, which it will be remembered is a rear view, so that the sliding bar 202 moves to the left as seen in Fig. 14. This causes the banding plate to swing through a small arc in left-handed or contra-clockwise direction. Owing to the lost motion at 208, see Fig. 13, between the rack 124 which actuates the bottle spinning mechanism and the rod 41 which engages the pedal and moves the rack and is rigidly connected to the rod 206 carrying the cam 205, this motion is completed prior to the beginning of the rotation of the bottle. The duckpin is in the position relative to the duckpin arm 275 shown in Fig. 14, so that the motion of the duckpin is arrested and the gear 238 and the pulley 265 must rotate relatively to the plate which rotation is transmitted to the intermeshing gears. The rotation resulting is sufficient to feed the paper band forward and bring it into the grip of the belt 266 where it is pressed against the bottle as hereinafter described. The rotation of the gear 238 also causes corresponding rotation, contra-clockwise, of the gear 235, carried on the shaft 201 with the brush 226 and the pawl 228, the latter being now held out of mesh with the ratchet 230 by the cam 240, the motion being sufficient to carry the lug 243 on the pawl by the stop pin 244 which coöperates with the lug. The cam 247 operates almost immediately, thrusting the pin out into the path of the lug to be engaged by it when it has made a complete revolution with the brush, etc., and the pawl passes off the end of the cam 240 at 241 snapping back into engagement with the ratchet 230 carried by the sleeve 225 on the shaft 201 with the sprocket 232 which is driven from the bottle spinning shaft. The initial motion just referred to also serves to tighten the belt 266 swinging the pulley 265 upward to the right about the center 201 as seen in Fig. 14 and moving the pulley 268 to the left in the said figure. The bottle having received the crimped cap is now brought up into the bottle grippers and rotated causing the banding mechanism, i. e., ratchet 230, etc., which is driven from the bottle spinning shaft to likewise rotate. The pawl 228 being now in mesh with the ratchet 230 causes the paste brushes and the gear 235 to rotate contra-clockwise. This rotation is communicated to the perforating mechanism 237 and to the gear 238 carrying the belt drive or duckpin pulley 265, the latter moving in right-handed rotation so that the duckpin does not come in contact with the duckpin arm. The tightening of the belt presses the end of the band 290 against the bottle and the latter, driven by the bottle spinning mechanism which now operates, makes a predetermined number of revolutions depending on the gearing, the rotation provided being such as is considered sufficient to make the cap secure. During this rotation, the band is held against the bottle by the belt 266 and wound tightly around it at the periphery of the skirt. The time of operation is dependent on the relative sizes of the gears and number of teeth in the gears 235, 236 and 238. The gear 235 makes a complete revolution from the point of starting, when the pawl 228 comes in contact with the cam 240 and is thrown out of mesh with the ratchet 230. At the same time, the lug 243 comes in contact with the stop pin 244 and arrests the operation of the mechanism. The continued rotation of the bottle causes the band, the feeding of which is thus stopped, to break at the place where it is perforated and further rotation in contact with the belt 266 causes the band to be brushed smooth about the bottle skirt. As the pedal is released, the parts drop back to their original positions as previously described, the belt is loosened by the contact of the curved surface 213 of the cam 205 with the follower 204 swinging the lever 203 to the left in Fig. 13 and to the right in Fig. 14 with the slide bar 202. The parts then return to their initial position in the manner and sequence already described. The bottle is released from the grippers and removed from the machine, the operation of capping being complete.

I have thus described a machine embodying the various features of my invention specifically and in detail in order that its nature and operation may be clearly understood; however, the specific terms herein are used descriptively rather than in their limiting sense and the scope of the invention is defined in the claims:

1. In a machine for capping bottles, means for applying a skirted cap, including grippers holding the bottle with the cap attached by the neck portion directly beneath the lip, a shaft carrying the grippers and means for rotating the shaft and bottle.

2. In a bottle capping machine, means for gripping and spinning the bottle including a central shaft carrying a cup to fit over the mouth of the bottle with the cap thereon, a sleeve surrounding the shaft, a plurality of gripper levers carried thereby, means for sliding the cup with the central shaft relatively to the sleeve with the grippers causing the grippers to close as the bottle neck enters between them.

3. In a bottle capping machine, an internal and an external die for cutting paper blanks, a grooved plaiting ring or die carried by the internal cutting die, a plurality of plaiting fingers to coöperate with the crimping die, and means for moving the internal cutting die through the external cutting die causing the plaiting fingers to coöperate with the grooved plaiting ring.

4. In a machine for capping bottles, an internal cutting die and an external cutting die, means for feeding a web of paper between the dies, plaiting fingers with the external die, a plaiting ring with the internal die, a bottle support, means for moving the cutting dies to cause the internal die to pass into the external cutting die, severing a blank from the paper and causing the plaiting fingers to coöperate with the plaiting die, plaiting the edge of the blank forming it into a skirt, and means for moving the bottle support causing it to thrust the bottle neck through the plaiting ring removing the cap from engagement with the ring.

5. In a machine for capping bottles, an internal cutting die, an external cutting die, means for feeding a web of paper between the dies, plaiting fingers with the external die, a plaiting ring with the internal die, a bottle support, means for moving the cutting dies to cause the internal die to pass into the external cutting die, severing a blank from the paper and causing the plaiting fingers to coöperate with the plaiting die, plaiting the edge of the blank forming it into a skirt, means for moving the bottle support causing it to thrust the bottle neck through the plaiting ring removing the cap from engagement with the ring, and means for wrapping a band about the skirt of the cap and neck of the bottle before it is withdrawn.

6. In a bottle capping machine, an internal die, an external die, skirt forming and plaiting mechanism secured to each die, means operating the dies to cut a blank and form a plaited skirt thereon, means for thrusting the bottle through the dies and thus removing the cap from the plaiting mechanism, and means for completing the capping operation.

7. In a bottle capping machine, an internal die, an external die, skirt forming and plaiting mechanism secured to each die, means operating the dies to cut a blank and form a plaited skirt thereon, means for thrusting the bottle through the dies and thus removing the cap from the plaiting mechanism, a gripping mechanism above the dies to receive the capped bottle as it is thrust through the dies, and means for rotating the gripping mechanism.

8. In a machine for capping bottles, means for plaiting the periphery of the blanks independently of the bottles, means for thrusting the bottle through the plaiting means, seating the cap on the bottle neck and releasing it from the plaiting means.

9. In a machine for capping bottles, a stationary external die, a moving internal die for cutting bottle cap blanks, means for plaiting the periphery of the blanks, said means being attached to and operated with the dies, means for thrusting the bottle through the dies and the plaiting means, seating the cap on the bottle neck and releasing it from the plaiting means, a reciprocating member operating said means by a single forward stroke, means for spinning the bottle, said means consisting of a gripping mechanism above the dies to receive and grip the neck of the bottle with the cap thereon, and means for rotating the gripping mechanism.

10. In a bottle capping machine, a vertically reciprocating member carrying a toothed pinion, a stationary rack engaged by the pinion and a sliding rack engaging the pinion from the opposite side, a bottle support carried by the sliding rack, an internal plaiting die with a central opening to admit the bottle, said plaiting die being carried by the reciprocating member, and a stationary external plaiting die.

11. In a bottle capping machine, a vertically reciprocating member carrying a toothed pinion, a stationary rack engaged by the pinion and a sliding rack engaging the pinion from the opposite side, a bottle support carried by the sliding rack, an internal plaiting die with a central opening to admit the bottle, carried by the said reciprocating member, a stationary external plaiting die, means for locking the sliding rack relatively to the vertically reciprocating member, and means for releasing the lock.

12. In a bottle capping machine, a vertically reciprocating member carrying a toothed pinion, a stationary rack engaged by the pinion and a sliding rack engaging the pinion from the opposite side, a bottle support carried by the sliding rack, an internal plaiting die with a central opening to receive the bottle carried by the said vertically reciprocating member, a stationary external plaiting die, means for locking the rack carrying the internal die relatively to the vertically reciprocating member, means for releasing the lock at the top of the stroke, means for locking the internal die carrying member to the frame when it is released, and means for releasing the said latter lock when the reciprocating rack member is on its return stroke.

13. In a bottle capping machine, a reciprocating member carrying a toothed pinion, a stationary rack engaged by the pinion and a sliding rack engaging the pinion from the opposite side, a bottle support carried by the sliding rack, an internal plaiting die with a central opening to receive the bottle carried by the said reciprocating member, a stationary external plaiting die, means for locking the sliding rack relatively to the reciprocating member, means for releasing the lock at the top of the stroke, means for locking the internal die carrying member to the frame when it is released, means for releasing the said latter lock when the reciprocating rack member is on its return stroke, a gripper above the plaiting dies to receive the bottle with the cap thereon and rotate it, and means above the dies for feeding a tension member to be wrapped around the skirt of the cap while the bottle is rotated.

14. In a bottle capping machine in combination, a vertically reciprocating bottle support, a vertically reciprocating internal plaiting die, the path of reciprocation of the die terminating short of that of the bottle, the internal die having an opening for the bottle neck to pass through, an external plaiting die coöperating with the internal plaiting die at the end of the traverse of the latter so that the bottle projects through the dies after the plaiting operation, gripping means to engage the bottle with the cap thereon when it protrudes through the dies, and means for rotating the gripping means.

15. In a bottle capping machine in combination, a vertically reciprocating bottle support, a vertically reciprocating internal plaiting die, the path of reciprocation of the die terminating short of that of the bottle, the internal die having an opening for the bottle neck to pass through, an external plaiting die coöperating with the internal plaiting die at the end of the traverse of the latter so that the bottle projects through the dies after the plaiting operation, gripping means to engage the bottle with the cap thereon when it protrudes through the dies, means for rotating the gripping means, and means for feeding a tension member to the bottle skirt above the dies so that it is wrapped about the skirt when the bottle rotates.

16. In a bottle capping machine, blank-cutting dies, means for feeding a paper blank between the dies, plaiting means carried by the cutting dies including an external and an internal plaiting die, means for moving the dies to cause them to coöperate first in cutting the blank and then passing the internal die with the blank into the external die producing a crimped cap, and means for passing the neck of the bottle through the dies causing it to remove the cap from the grip of the dies.

17. In a bottle capping machine, blank-cutting dies, means for feeding a paper blank between the dies, plaiting means carried by the cutting dies including an external and an internal plaiting die, means for moving the dies to cause them to coöperate first in cutting the blank and then passing the internal die with the blank into the external die producing a crimped cap, means for passing the neck of the bottle through the dies causing it to remove the cap from the grip of the dies, bottle gripping means in registration with the dies to engage the bottle neck with the cap thereon as it is thrust through the dies, means for rotating the same, and means for feeding a band to the neck just above the dies as the bottle rotates.

18. In a bottle capping machine in combination, a swinging lever, a vertically moving rod carried thereby, a sliding member, a latch for locking the same to the rod, means for releasing the latch at a certain point in the reciprocation of the rod, a second sliding member carried by the first said member with means for moving the second sliding member relatively to the first and multiplying the motion of the second said member, an internal die carried by the first sliding member, a bottle support carried by the second sliding member, means for locking the die relatively to the first sliding member, means for releasing it at a predetermined point in the stroke, means for locking the die to a stationary object as it is released from the sliding member, means for releasing said second lock on the return stroke of the bottle support, and a die coöperating with the first mentioned die.

19. In a bottle capping machine in combination, a swinging lever, a vertically moving rod carried thereby, a sliding member, a latch for locking the same to the rod, means for releasing the latch at a certain point in the reciprocation of the rod, a second sliding member carried by the first said member with means for moving the second sliding member relatively to the first and multiplying the motion of the second said member, an internal die carried by the first sliding member, a bottle support carried by the second sliding member, means for locking the die relatively to the first sliding member, means for releasing it at a predetermined point in the stroke, means for locking the die to a stationary object as it is released from the sliding member, means for releasing said second lock on the return stroke of the bottle support, a die coöperating with the first mentioned die, and a latch supporting the first said sliding member on the frame.

20. In a bottle capping machine in combination, a swinging lever, a vertically moving rod carried thereby, a sliding member, a latch for locking the same to the rod, means for releasing the latch at a certain point in the reciprocation of the rod, a second sliding member carried by the first said member with means for moving the second sliding member relatively to the first and multiplying the motion of the second said member, an internal die carried by the first sliding member, a bottle support carried by the second sliding member, means for locking the die relatively to the first sliding member, means for releasing it at a predetermined point in the stroke, a fixed support, means for locking the die to the fixed support as it is released from the sliding member, means for releasing said second lock on the return stroke of the bottle support, a die coöperating with the first mentioned die, bottle spinning means and band feeding means operating on the bottle and cap when the moving die is locked to said fixed support.

21. In a bottle capping machine in combination, a swinging lever, a vertically moving rod carried thereby, a sliding member, a latch for locking the same to the rod, means for releasing the latch at a certain point in the reciprocation of the rod, a second sliding member carried by the first said member with means for moving the second sliding member relatively to the first and multiplying the motion of the second said member, an internal die carried by the first sliding member, a bottle support carried by the second sliding member, means for locking the die relatively to the first sliding member, means for releasing it at a predetermined point in the stroke, means for locking the die to the frame of the machine as it is released from the sliding member, means for releasing said second lock on the return stroke of the bottle support, a die coöperating with the first mentioned die, a latch supporting the first said sliding member on the frame, bottle spinning means and band feeding means operating on the bottle and cap when the internal die is supported on the frame, the spinning means being arranged to be operated by the swinging lever in the latter portion of its stroke, and a cam member or dog carried by said mechanism to release the locking means of the first sliding member at the end of the spinning operation.

Signed by me at Baltimore, Maryland, this 1st day of March, 1917.

THOMAS S. BELL.

Witnesses:
PORTER H. FLAUTT,
ZELLA KUHN.